(12) United States Patent
Whittle et al.

(10) Patent No.: US 10,975,708 B2
(45) Date of Patent: Apr. 13, 2021

(54) TURBINE SECTION ASSEMBLY WITH CERAMIC MATRIX COMPOSITE VANE

(71) Applicant: Rolls-Royce plc, London (GB)

(72) Inventors: Michael J. Whittle, London (GB); Anthony G. Razzell, London (GB); Roderick M. Townes, London (GB); David J. Shepherd, London (GB); Duncan Forbes, London (GB)

(73) Assignee: Rolls-Royce plc, London (GB)

( * ) Notice: Subject to any disclaimer, the term of this patent is extended or adjusted under 35 U.S.C. 154(b) by 298 days.

(21) Appl. No.: 16/391,936

(22) Filed: Apr. 23, 2019

(65) Prior Publication Data

US 2020/0340365 A1    Oct. 29, 2020

(51) Int. Cl.

| | | |
|---|---|---|
| *F01D 9/02* | (2006.01) |
| *F01D 5/14* | (2006.01) |
| *F01D 5/28* | (2006.01) |
| *F01D 9/04* | (2006.01) |
| *F01D 11/00* | (2006.01) |
| *F01D 25/00* | (2006.01) |
| *F01D 25/24* | (2006.01) |
| *F01D 25/28* | (2006.01) |

(52) U.S. Cl.
CPC ............... *F01D 9/02* (2013.01); *F01D 5/147* (2013.01); *F01D 5/284* (2013.01); *F01D 9/041* (2013.01); *F01D 9/042* (2013.01); *F01D 11/001* (2013.01); *F01D 25/005* (2013.01); *F01D 25/246* (2013.01); *F01D 25/28* (2013.01); *F05D 2240/12* (2013.01); *F05D 2240/14* (2013.01); *F05D 2260/31* (2013.01); *F05D 2300/21* (2013.01)

(58) Field of Classification Search
CPC .......... F01D 5/147; F01D 5/284; F01D 9/041; F01D 9/042; F01D 25/246; F05D 2260/31
See application file for complete search history.

(56) References Cited

U.S. PATENT DOCUMENTS

| | | | |
|---|---|---|---|
| 5,078,576 A | 1/1992 | Hayton | |
| 5,129,783 A * | 7/1992 | Hayton | ............... F01D 11/005 415/209.3 |
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 | 11/2003 | Widrig et al. | |
| 6,860,716 B2 | 3/2005 | Czachor et al. | |
| 6,884,030 B2 | 4/2005 | Darkins, Jr. et al. | |

(Continued)

FOREIGN PATENT DOCUMENTS

| | | |
|---|---|---|
| EP | 3597866 A1 | 1/2020 |
| EP | 3670837 A1 | 6/2020 |

OTHER PUBLICATIONS

Extended European Search Report, European Application No. 20165663. 4-1004, dated Sep. 21, 2020, 4 pages.

*Primary Examiner* — Ninh H. Nguyen
(74) *Attorney, Agent, or Firm* — Barnes & Thornburg LLP

(57) ABSTRACT

A turbine assembly adapted for use in a gas turbine engine is disclosed in this paper. The turbine assembly includes a turbine vane comprising ceramic matrix composite materials configured for use in high temperature environments. The turbine assembly further includes a vane-stage support for holding the turbine vane and other components in place relative to a turbine case.

18 Claims, 4 Drawing Sheets

(56) References Cited

U.S. PATENT DOCUMENTS

| | | | |
|---|---|---|---|
| 7,201,564 B2 * | 4/2007 | Bolms | F01D 5/187 415/115 |
| 7,452,189 B2 * | 11/2008 | Shi | F01D 5/282 416/226 |
| 7,588,414 B2 | 9/2009 | Wunderlich et al. | |
| 7,762,766 B2 | 7/2010 | Shteyman et al. | |
| 8,292,580 B2 * | 10/2012 | Schiavo | F01D 5/189 416/96 A |
| 8,371,127 B2 | 2/2013 | Durocher et al. | |
| 8,454,303 B2 | 6/2013 | Garcia-Crespo | |
| 9,097,141 B2 | 8/2015 | Paradis | |
| 9,546,557 B2 | 1/2017 | Grooms, III et al. | |
| 9,890,663 B2 | 2/2018 | Scott | |
| 9,915,159 B2 | 3/2018 | Huizenga et al. | |
| 10,054,009 B2 | 8/2018 | Scott | |
| 10,174,627 B2 | 1/2019 | Chang et al. | |
| 2004/0253096 A1 | 12/2004 | Legg | |
| 2014/0004293 A1 * | 1/2014 | Grooms, II | F01D 9/065 428/99 |
| 2014/0234118 A1 | 8/2014 | Beaujard et al. | |
| 2014/0255174 A1 | 9/2014 | Duelm et al. | |
| 2016/0123163 A1 | 5/2016 | Freeman et al. | |
| 2016/0123164 A1 | 5/2016 | Freeman et al. | |
| 2016/0177761 A1 | 6/2016 | Huizenga et al. | |
| 2016/0201488 A1 | 7/2016 | Carr et al. | |
| 2017/0022833 A1 | 1/2017 | Heitman et al. | |
| 2017/0051619 A1 | 2/2017 | Tuertscher | |
| 2018/0045117 A1 | 2/2018 | Groves, II et al. | |
| 2018/0223680 A1 | 8/2018 | Hafner | |
| 2018/0238181 A1 | 8/2018 | Reynolds et al. | |
| 2018/0238184 A1 | 8/2018 | Reynolds et al. | |
| 2018/0328187 A1 | 11/2018 | Oke | |
| 2018/0340431 A1 | 11/2018 | Kerns et al. | |
| 2018/0370158 A1 | 12/2018 | Gallier et al. | |
| 2019/0071993 A1 | 3/2019 | Freeman et al. | |

* cited by examiner

TURBINE SECTION ASSEMBLY WITH CERAMIC MATRIX COMPOSITE VANE

FIELD OF THE DISCLOSURE

The present disclosure relates generally to gas turbine engines, and more specifically to turbine sections of such engines—especially those with ceramic matrix composite vanes.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine assembly adapted for use in a gas turbine engine with a turbine vane comprising ceramic matrix composite materials configured to redirect air moving through a primary gas path of the gas turbine engine may include a turbine case, a vane stage, and a vane-stage support. The turbine case may be arranged around a central reference axis and may include an annular shell and a locating hanger. The locating hanger may extend radially inwardly from the annular shell.

In some embodiments, the vane stage may include the turbine vane comprising ceramic matrix composite materials and an inner vane seal land. The turbine vane may be shaped to form an airfoil that extends across the primary gas path of the gas turbine engine. The inner vane seal land may be located radially inward of the turbine vane. The inner vane seal land may be configured to be engaged by a rotating component to create a seal separating pressure zones within the gas turbine engine when the turbine assembly is used in the gas turbine engine.

In some embodiments, the vane-stage support may comprise metallic materials and be configured to hold the turbine vane and the inner vane seal land in place relative to the turbine case. The vane-stage support may include a case mount and a spar. The case mount may couple to the annular shell and engage the locating hanger to axially and radially align the vane-stage support relative to the turbine case. The spar may extend from the case mount radially through the airfoil of the turbine vane to the inner vane seal land. The turbine vane and the inner vane seal land may be coupled to the spar so that forces applied to the vane stage are carried by the spar to the case mount and case during use of the turbine assembly in the gas turbine engine.

In some embodiments, the case mount may include a coupling flange, a retainer ring, and a clamp fastener. The coupling flange may extend along a radially-inwardly facing surface of the turbine case. The retainer ring may be spaced axially from the locating hanger with the coupling flange sandwiched axially therebetween. The clamp fastener may be configured to clamp a portion of the coupling flange between the annular shell and the retainer ring.

In some embodiments, the coupling flange may include a spar fixture portion, a forward portion, and an aft portion. The spar fixture portion may extend to and is integrally formed with the spar of the vane-stage support. The forward portion may extend axially forward of the spar fixture portion and engage the locating hanger of the turbine case. The aft portion may extend axially aft of the spar fixture portion and engage the retainer ring.

In some embodiments, the retainer ring includes a radially extending portion and an axially extending portion. The radially extending portion may extend radially inward from the annular shell. The axially extending portion may extend axially forward from the radially extending portion to form an L-shape when viewed in cross-section circumferentially around the central reference axis.

In some embodiments, the clamp fastener may extend the annular shell of the turbine case, through the aft portion of the coupling flange, and into the retainer ring to clamp the aft portion of the coupling flange between the annular shell of the turbine case and the retainer ring. In some embodiments, the clamp fastener may extend radially-inwardly into the annular shell of the turbine case and the radially extending portion of the retainer ring to clamp a portion of the coupling flange between the annular shell of the turbine case and the retainer ring.

In some embodiments, the turbine case may further include a locating pin. The locating pin may extend radially inward through a pin hole formed in the annular shell of the turbine case and into the spar fixture portion of the coupling flange and configured to circumferentially align the vane-stage support relative to the turbine case.

In some embodiments, the turbine case may further include a mount flange. The mount may extend radially-outwardly from the annular shell axially aft of the locating hanger.

In some embodiments, the retainer ring may further include a retainer ring backstop. The retainer ring backstop may extend through a portion of the annular shell outside of the turbine case and aft of the mount flange and engage the radially extending portion of the retainer ring. In some embodiments, the clamp fastener may extend axially forward through the retainer ring backstop and into the mount flange of the turbine case to clamp the coupling flange between the retainer ring and the locating hanger.

In some embodiments, the locating hanger includes a radially extending portion and an axially extending portion. The radially extending portion may extend radially inward from the annular shell. The axially extending portion may extend axially aft from the radially extending portion to form an L-shape when viewed in cross-section circumferentially around the central reference axis.

According to an aspect of the disclosure, a turbine assembly adapted for use in a gas turbine engine may include a turbine case, a turbine vane, and inner vane seal land, and a vane-stage support. The turbine case may be arranged around a reference central axis. The turbine vane may comprise ceramic matrix composite materials and may be shaped to form an airfoil. The inner vane seal land may be located radially inward of the turbine vane. The vane-stage support may be configured to hold the turbine vane and the inner vane seal land in place relative to the turbine case. In some embodiments, the inner vane seal land is fixed to the spar at a location radially inward of the turbine vane.

In some embodiments, the turbine case may include a locating hanger. In some embodiments, the turbine case may further include a locating pin. The locating pin may extend radially inward through a pin hole formed in the turbine case and into a case mount of the vane-stage support and may be configured to circumferentially align the vane-support structure relative to the turbine case.

In some embodiments, the turbine case may further include a mount flange. The mount flange may extend radially-outwardly from the turbine case axially aft of the locating hanger.

In some embodiments, the case mount may include a coupling flange and a retainer ring. The coupling flange may be engaged with a radially-inwardly surface of the case. The retainer ring may be spaced axially from the locating hanger with the coupling flange sandwiched axially therebetween to couple the vane-sage support to the turbine case.

In some embodiments, the case mount may further include a clamp fastener. The case fastener may be configured to clamp a portion of the coupling flange between the turbine case and the retainer ring.

In some embodiments, the case fastener may extend into the turbine case, through a portion of the coupling flange, and into the retainer ring to secure the case mount to the turbine case. In some embodiments, the case fastener may extend into the turbine case and the retainer ring to secure the case mount to the turbine case.

In some embodiments, the spar of the vane-stage support may include a rod, an outer load transfer collar, and an inner load transfer collar. The rod may extend radially through the airfoil of the turbine vane. The outer load transfer collar may extend axially forward and aft of the rod and contacts the turbine vane. The inner load transfer collar may be spaced radially inwardly from the outer load transfer collar and may extend axially forward and aft of the rod and contacts the turbine vane.

In some embodiments, the retainer ring may include a radially extending portion and an axially extending portion. The radially extending portion may extend radially inward from the turbine case. The axially extending portion may extend axially forward from the radially extending portion to form an L-shape when viewed in cross-section circumferentially around the central reference axis with a flange receiver configured to receive an aft portion of the coupling flange.

In some embodiments, the retainer ring may further include a retainer ring backstop. The retainer ring backstop may extend outside of the turbine case through a slot formed in the turbine case aft of a mount flange formed in the turbine case. The retainer ring backstop may engage the radially extending portion of the retainer ring and clamp fastener may extend axially through the retainer ring backstop into the mount flange to put tension on the retainer ring.

These and other features of the present disclosure will become more apparent from the following description of the illustrative embodiments.

DETAILED DESCRIPTION OF THE DRAWINGS

Figure 1:
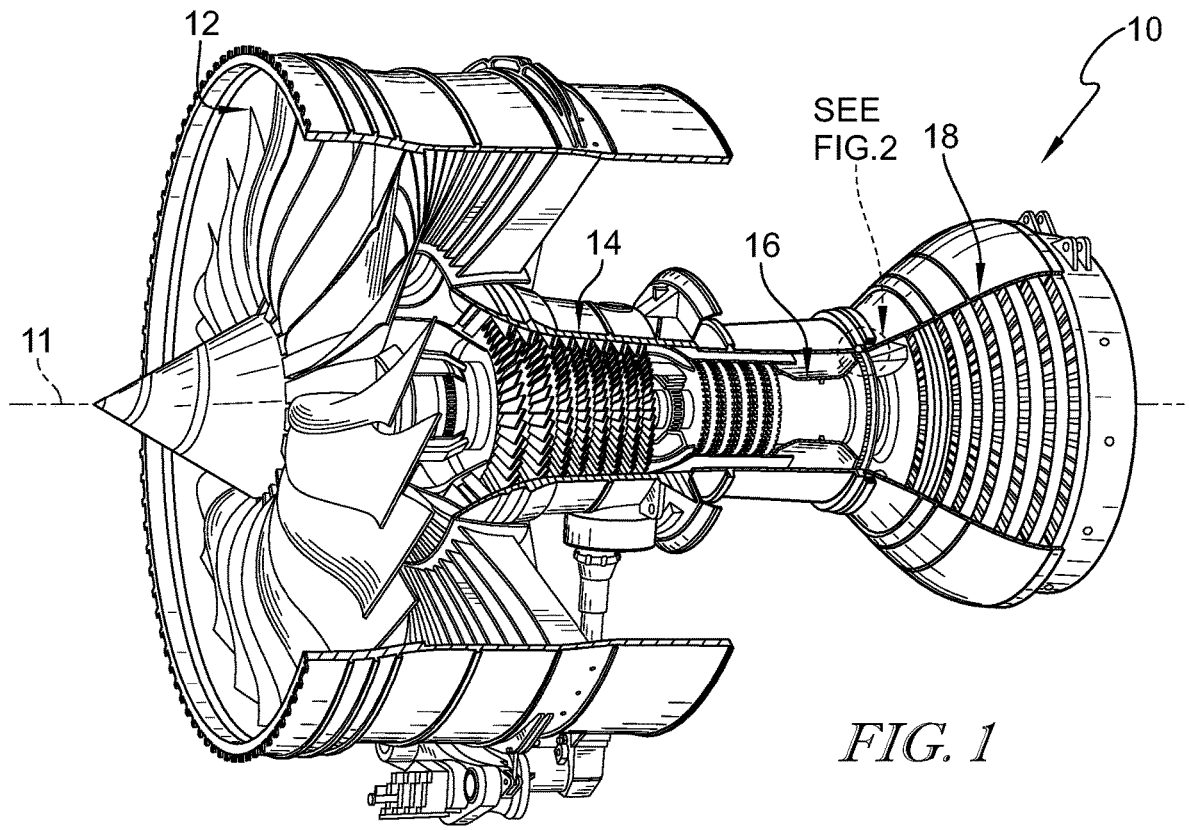
FIG. 1 is a cutaway view of a gas turbine engine that includes a fan, a compressor, a combustor, and a turbine assembly in accordance with the present disclosure that is adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
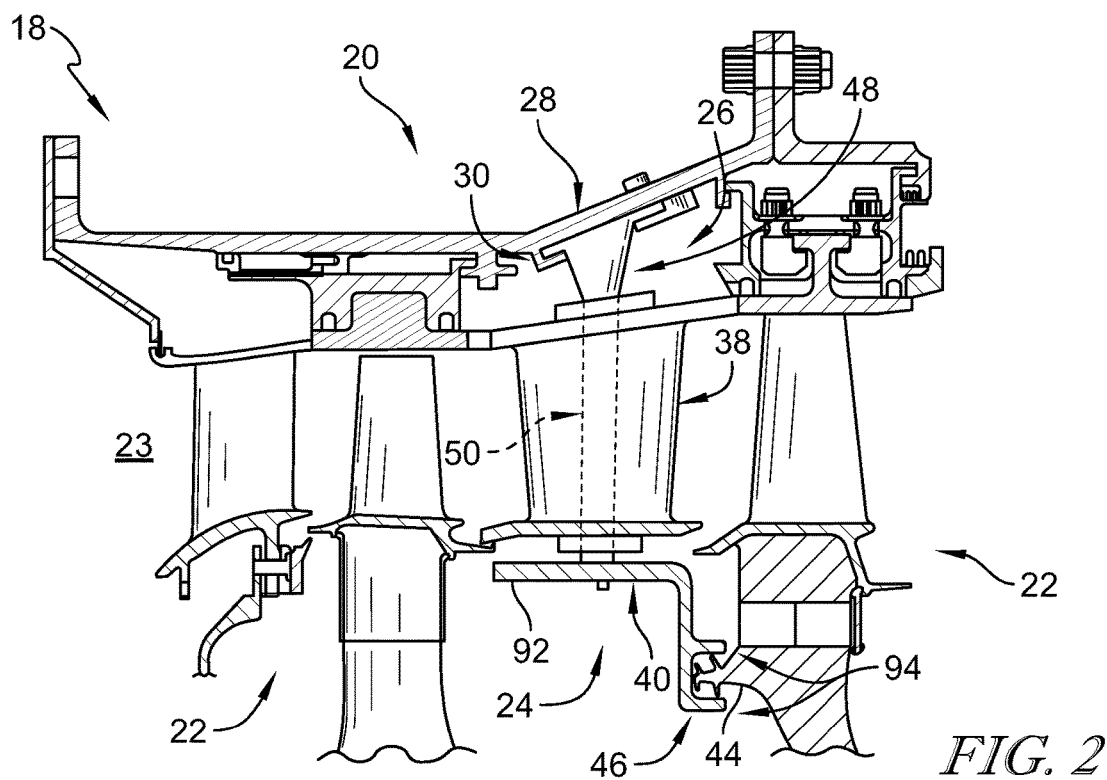
FIG. 2 is a cross sectional view of a portion of the turbine assembly of the gas turbine engine of FIG. 1 showing that the turbine assembly includes a turbine case, a plurality of turbine wheel assemblies, a vane stage made up of a vane with an airfoil and an inner vane seal land engaged by a seal rotor included in a turbine wheel assembly, and a vane-stage support that holds the vane stage in place relative to the turbine case.

A turbine assembly 18 according to the present disclosure is adapted for use in a gas turbine engine 10 as suggested in FIGS. 1 and 2. The gas turbine engine 10 includes a fan 12, a compressor 14, a combustor 16, and the turbine assembly 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine assembly 18 includes a turbine case 20, a plurality of turbine wheel assemblies 22, a vane stage 24, and a vane-stage support 26 as shown in FIG. 2. Each turbine wheel assembly 22 is configured to interact with the hot combustion gases from the combustor 16 and rotate about a center axis 11 of the gas turbine engine 10 to drive the compressor 14 and/or the fan 12. The vane stage 24 is located between the turbine wheel assemblies 22 and includes (i) a turbine vane 38 configured to redirect air moving through a primary gas path 23 of the gas turbine engine 10 and (ii) an inner vane seal land 40 that is engaged by a seal rotor 44 to seal compartments within the turbine assembly 18. The vane-stage support 26 is configured to hold the turbine vane 38 and the inner vane seal land 40 included in the vane stage 24 in place relative to the turbine case 20.

The vane-stage support 26 provides a means for holding the vane stage 24 in a predetermined orientation relative to the turbine case 20 while also transferring aerodynamic loads applied to the vane stage 24 out through the turbine case 20. In the illustrative embodiments, the vane stage 26 is axially and radially located relative to the turbine case 20 using locating hanger 30 in the case 20. The vane stage 26 also engages the turbine vane 38 and the inner vane seal land 40 so that forces applied to the vane stage 24 are carried by the vane-stage support 26 and case 20 during use of the turbine assembly 18 in the gas turbine engine 10.

In the illustrative embodiment, the turbine vane 38 included in the vane stage 24 comprises ceramic matrix materials while the vane-stage support 26 comprises metallic materials. The ceramic matrix composite vane 38 is adapted to withstand high temperatures, but may have relatively low strength compared to the metallic vane-stage support 26. The vane-stage support 26 provides structural strength to the vane stage components 38, 40 by receiving the force loads, such as the aerodynamic loads applied to the vane 38 and the axial loads applied to the inner vane seal land 40, and transferring the loads directly from the vane-stage support 26 out through the casing 20.

Figure 3:
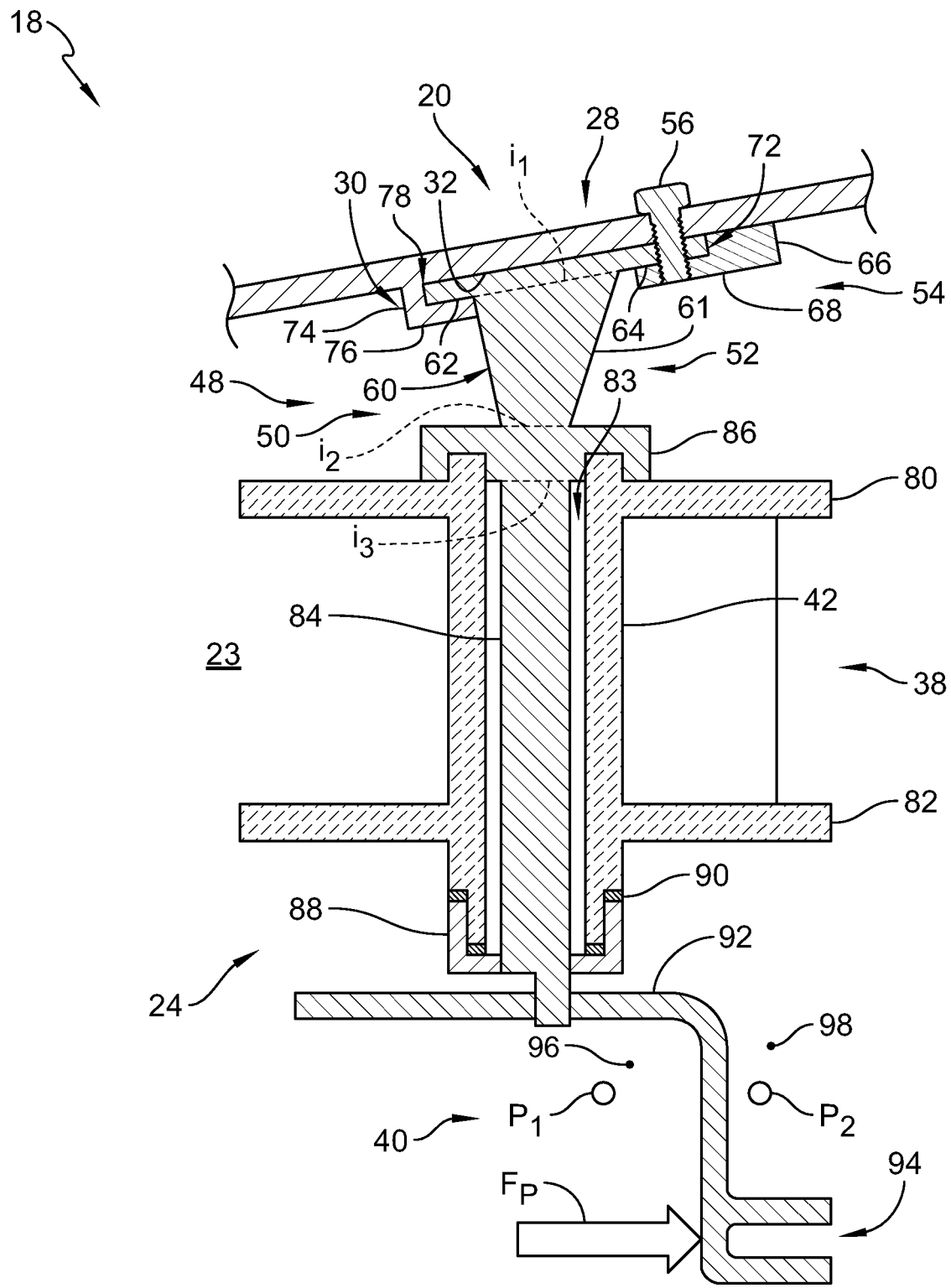
FIG. 3 is a detail view of the turbine assembly of FIG. 2 showing the vane-stage support includes a case mount coupled to the case that engages a locating hanger of the turbine case to axially and radially align the vane-stage support relative to the turbine case, a spar that extends from the case mount radially through an airfoil of the turbine vane stage to an inner vane seal land to transmit forces applied to the vane stage to the case mount and out through the turbine case, and a case fastener that extends into a retainer ring of the case mount to couple the case mount directly to the case.

The vane-stage support includes a case mount 48 and a spar 50 as shown in FIG. 3. The case mount 48 couples to the turbine case 20 and engages a locating hanger 30 included in the turbine case 20 to axially and radially align the vane-stage support 26 relative to the turbine case 20. The spar 50 extends from the case mount 48 radially through the turbine vane 38 to the inner vane seal land 40. In the illustrative embodiment, the case mount 48 and the spar 50 are integrally formed as a single component.

In the illustrative embodiment, the turbine vane 38 and the inner vane seal land 40 engage the spar 50 so that forces applied to the vane stage 24 are carried by the spar 50 to the case mount 48 and case 20 during use of the turbine assembly 18 in the gas turbine engine 10. The turbine vane 38 engages the spar 50 at both radially inner and outer ends of the turbine vane 38 outside the primary gas path 23 to transfer aerodynamic loads applied to the vane 38 from the spar 50 directly to the turbine case 20. The inner vane seal land 40 engages the spar 50 radially inward of the vane 38 to transfer axial loads, such as the pressure force Fp applied to the seal land 40 from the spar 50 directly to the turbine case 20.

The case mount 48 includes a coupling flange 52, a retainer ring 54, and a clamp fastener 56 as shown in FIG. 3. The coupling flange 52 extends along a radially-inwardly facing surface 32 of the turbine case 20. The retainer ring 54 is spaced axially from the locating hanger 30 with the coupling flange 52 sandwiched axially therebetween. The clamp fastener 56 is configured to clamp a portion of the coupling flange 52 between an annular shell 28 of the turbine case 20 and the retainer ring 54.

The coupling flange 52 includes a spar fixture portion 60, a forward portion 62, and an aft portion 64 as shown in FIG. 3. The spar fixture portion 60 extends to and is integrally formed with the spar 50 of the vane-stage support 26. The forward portion 62 extends axially forward of the spar fixture portion 60 and engages the locating hanger 30 of the turbine case 20. The aft portion 64 extends axially aft of the spar fixture portion 60 and engages the retainer ring 54.

In the illustrative embodiment, the clamp fastener 56 extends radially-inwardly into the annular shell 28, through the aft portion 64 of the coupling flange 52, and into the retainer ring 54 to clamp the aft portion 64 between the annular shell 28 of the turbine case 20 and the retainer ring 54. In some embodiments, the clamp fastener 56 only extends radially-inwardly into the annular shell 28 and the retainer ring 54 to clamp the aft portion 64 of the coupling flange 52 between the annular shell 28 and the retainer ring 54.

The spar fixture portion 60 is formed to include a radially outer interface i1, a radially inner interface i2, and an outer surface 61 as shown in FIG. 3. The radially outer interface i1 interfaces the coupling flange and has a first axial length when viewed circumferentially around the central reference axis 11. The radially inner interface ii is spaced radially inward of the radially outer interface i1 relative to the central reference axis 11 and interfaces the spar 50. The radially inner interface i2 has a second axial length when view circumferentially around the central reference axis that is less than the first axial length. The outer surface 61 extends between and interconnects the radially outer and inner interfaces i1, i2.

The retainer ring 54 includes a radially extending portion 66 and an axially extending portion 68 as shown in FIG. 3. The radially extending portion 66 extends radially inward from the annular shell 28. The axially extending portion 68 extends axially forward from the radially extending portion 66 to form an L-shape when viewed in cross-section circumferentially around the central reference axis 11.

In the illustrative embodiment, the axially extending portion 68 is spaced apart from the annular shell 28 of the case 20 to form an aft flange-receiver channel 72. The aft flange-receiver channel 72 receives the aft portion 64 of the coupling flange 52 to sandwich the aft portion 64 between the annular shell 28 and the retainer ring 54.

Turning again to the turbine case 20, turbine case 20 includes the annular shell 28 and the locating hanger 30 as shown in FIGS. 2 and 3. The annular shell 28 extends around the central reference axis 11. The locating hanger 30 extends radially-inwardly from the annular shell 28 axially forward of the retainer ring 54 to provide axial and radial alignment of the vane-stage support 26 relative to the case 20. In the illustrative embodiment, the case mount 48 couples to the annular shell 28 and engages the locating hanger 30 to axially and radially align the vane-stage support 26 relative to the turbine case 20.

In the illustrative embodiment, the locating hanger 30 includes a radially extending portion 74 and an axially extending portion 76 as shown in FIG. 3. The radially extending portion 74 extends radially inward from the annular shell 28. The axially extending portion 76 extends axially aft from the radially extending portion 74 to form an L-shape when viewed in cross-section circumferentially around the central reference axis 11.

In the illustrative embodiment, the radially extending portion 74 engages the radially-inwardly facing surface 32 of the turbine case 20. The axially extending portion 74 is spaced apart from the annular shell 28 of the case 20 to form a forward flange-receiver channel 78. The forward flange-receiver channel 78 receives the forward portion 62 of the coupling flange 52 to clamp the forward portion 62 between the annular shell 28 and the locating shoulder 30 and axially and radially locate the case mount 48 relative to the case 20.

In the illustrative embodiment, the forward portion 62 is attached to the turbine case 20 by securing the forward portion 62 in the channel 78 formed by the locating hanger 30. The locating hanger 30 axially and radially aligns the coupling flange 52 relative to the casing 20 before the retainer ring 54 is fixed into place onto the case 20 with the aft portion 64 of the coupling flange 52 in the channel 72. The clamp fastener 56 then extends through the annular shell 28, the aft portion 64, and the retainer ring 54 to clamp the aft portion 64 between the annular shell 28 of the turbine case 20 and the retainer ring 54, attaching the coupling flange 52 to the casing 20.

Turning again to the vane stage 24, the vane stage 24 includes the turbine vane 38 and the inner vane seal land 40 as shown in FIG. 3. The turbine vane 38 comprising ceramic matrix composite materials is shaped to form an airfoil 42 that extends across the primary gas path 23 of the gas turbine engine. The inner vane seal land 40 is located radially inward of the turbine vane 38 and is configured to be engaged by the seal rotor 44 to create a compartment seal 46 separating pressure zones P1 and P2 within the gas turbine engine 10 when the turbine assembly 18 is used in the gas turbine engine 10. The difference of pressure causes a pressure force Fp to act on the inner vane seal land 40, which results in an axial moment in the turbine assembly 18.

The turbine vane 38 includes the airfoil 42, an outer end wall 80, and an inner end wall 82 as shown in FIG. 3. The inner end wall 82 is spaced radially inward of the outer end wall 80. The airfoil 42 extends between and interconnects the outer end wall 80 and the inner end wall 82. The airfoil 42 is shaped to redirect air moving along the primary gas path 23 of the turbine assembly 18 that extends radially from the outer end wall 80 to the inner end wall 82. The airfoil 42 is also shaped to include a vane cavity 83 extending radially through the airfoil 42 and opens at the inner and outer end walls 80, 82. The outer end wall 80 defines a radially outer boundary of the primary gas path 23 and the inner end wall 82 defines a radially inner boundary of the primary gas path 23.

In the illustrative embodiment, the outer end wall 80, inner end wall 82, and the airfoil 42 of the vane 38 are integrally formed from ceramic matrix composite materials such that the outer end wall 80, inner end wall 82, and the airfoil 42 are included in a one-piece vane component as shown in FIGS. 2 and 3. In other embodiments, the outer end wall 80, inner end wall 82, and the airfoil 42 may be formed as separate components.

In the illustrative embodiment, the spar 58 extends from the case mount 48 radially through the airfoil 42 of the turbine vane 38 to the inner vane seal land 40. The spar includes a rod 84, an outer load transfer collar 86, and an inner load transfer collar 88 as shown in FIG. 3.

The rod 84 extends radially through the airfoil 42 of the turbine vane 44. In some embodiments, the rod 84 may be hollow and include cooling holes to transmit cooling air to the vane 38 and/or into the inter-disk cavity between the turbine wheels 22. The outer load transfer collar 86 extends axially forward and aft of the rod 84 and contacts the turbine vane 38 at a radially outer end of the turbine vane 38. The inner load transfer collar 88 is spaced radially inwardly from the outer load transfer collar 86 and extends axially forward and aft of the rod 84 and contacts the turbine vane 38 a radially inner end of the turbine vane 338.

In the illustrative embodiment, the rod 84 is formed to include an interface i3 as shown in FIG. 3. The interface i3 interfaces the outer load transfer collar 86 and has a third axial length when viewed circumferentially around the central reference axis 11. The third axial length is equal to the second axial length and less than the first axial length in the illustrative embodiment. In other embodiments, the third axial length may be less than the second axial length. In some embodiments, the first axial length of the interface i1 may be increased to increase the second moment area of the coupling flange 52.

In the illustrative embodiment, the outer load transfer collar 86 contacts the turbine vane 38 at the radially outer end of the turbine vane 38 to transfer aerodynamic loads applied to the vane 38 from the vane 38 to the spar 58. The outer load transfer collar 86 contacts the turbine vane 38 at the radially outer end of the vane 38 so that the loads are transferred from the vane 38 to the vane-stage support 26 outside of the primary gas path 23.

Similarly, the inner load transfer collar 88 contacts the turbine vane 38 at the radially inner end of the turbine vane 38 to transfer aerodynamic loads applied to the vane 38 from the vane 38 to the spar 58. The inner load transfer collar 88 contacts the turbine vane 38 at the radially inner end of the vane 38 so that the loads are transferred from the vane 38 to the vane-stage support 26 outside of the primary gas path 23.

In the illustrative embodiment, the outer load transfer collar 86 is integrally formed with the rod 84 such that the rod 84 and the outer load transfer collar 86 are included in a one-piece support component. The inner load transfer collar 88 is a separate component assembled onto the rod 84 and fixed to the rod 84 by a suitable fastener such as a screwed joint, collet arrangement, clamp, or other suitable fastener. In some embodiments, the inner load transfer collar 88 is integrally formed with a portion of the inner vane seal land 40. In other embodiments, the outer load transfer collar 86 may be formed separately from the rod 84 and assembled to form the spar 58.

In the illustrative embodiment, a compliant layer 90 is arranged between the radially inner end of the turbine vane 38 and the inner load transfer collar 88 like as shown in FIG. 3. The compliant layer 90 is configured to seal between the radially inner end of the turbine vane 38 and the inner load transfer collar 88. The compliant layer 90 is also configured to allow radial movement of the turbine vane 38 relative to the vane-stage support 26 in response to thermal growth mismatch between the vane 38 and the vane-stage support 26 caused by different coefficients of thermal expansion of the vane 38 and the support 26 during use of the turbine assembly 18.

Turning again to the inner vane seal land 40, the inner vane seal land 40 includes a seal panel 92 and seal lands 94 as shown in FIGS. 2 and 3. The seal panel 92 divides the inter-disk cavity into axially adjacent compartments 96, 98 within the turbine assembly 18. The seal lands 94 extend axially aft and away from the seal panel 92. At least one seal land 94 is engaged by a rotatable seal element 44 of the turbine wheel 22 as shown in FIG. 2. In the illustrative embodiment, both seal lands 94 are engaged with the rotating seal element 44 to form the compartment seal 46 between the upstream and downstream turbine wheel assemblies 22. In some embodiments, the inner load transfer collar 88 is integrally formed with the seal panel 92 of the inner vane seal land 40.

The compartment seal 46 between the upstream and downstream turbine wheel assemblies 22 results in a first pressure P1 on the upstream turbine wheel side and a second pressure P2 on the downstream turbine wheel side. In the illustrative embodiment, the first pressure P1 is greater than the second pressure P2 resulting in a difference of pressure on either side of the inner vane seal land 40. The difference of pressure causes the pressure force Fp to act on the inner vane seal land 40 as shown in FIG. 3. The pressure force Fp results in an axial moment in the turbine assembly 18.

In the illustrative embodiment, the rod 84 of the spar 58 supports the inner vane seal land 40 so that forces applied to the inner vane seal land 40 are carried by the spar 58 to the case mount 48 and the case 20 during use of the turbine assembly 18.

Figure 4:
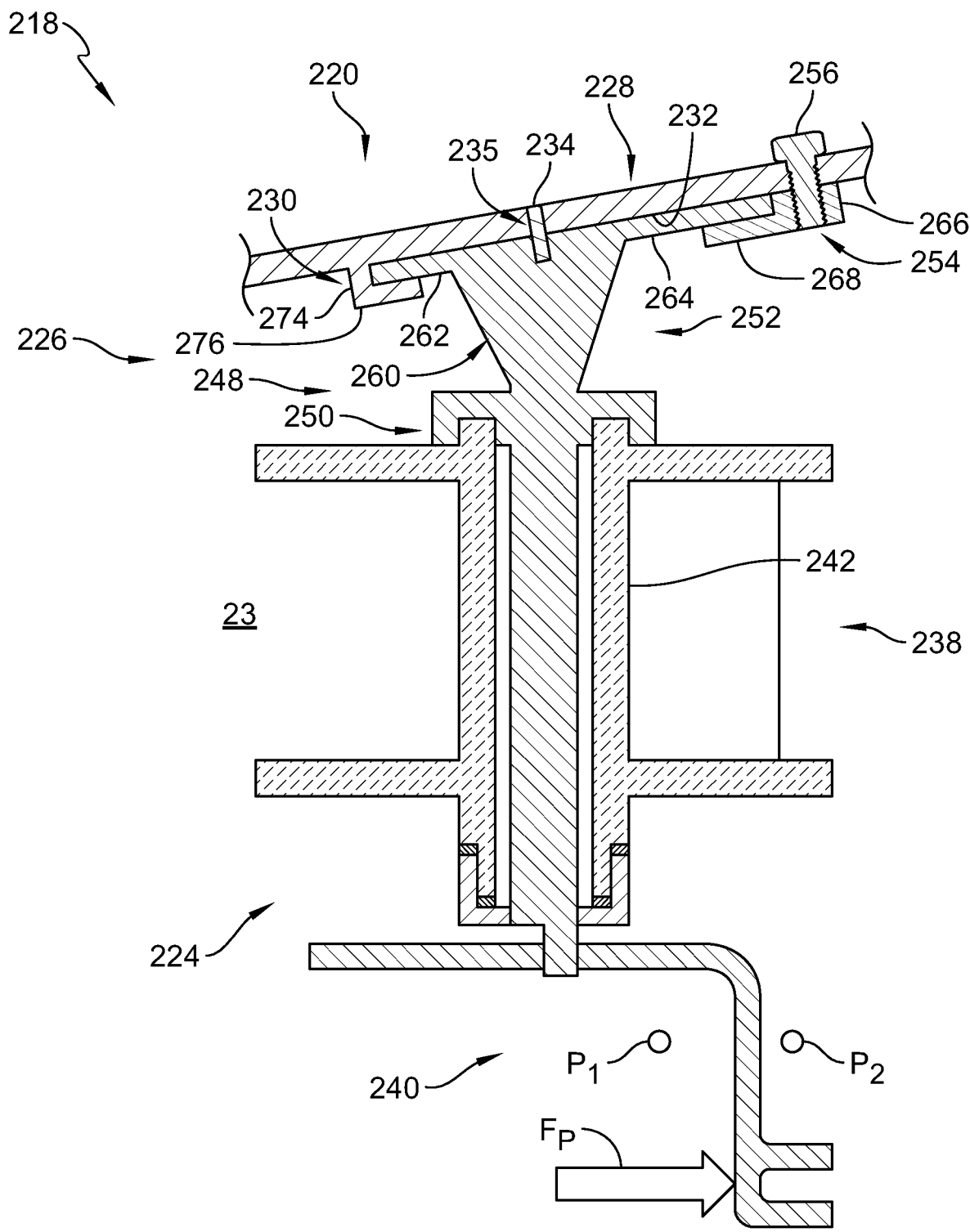
FIG. 4 is a detail view of another embodiment of a vane-stage support to be included in the turbine assembly of FIG. 2 showing that the vane-stage support includes a case mount, a spar that extends from the case mount radially through the vane stage, and a case fastener to couple the case mount directly to the case, and further showing the turbine case includes a locating pin that extends radially into a portion of the case mount to provide circumferential alignment of the vane-stage support relative to the case.

Another embodiment of a turbine assembly 218 in accordance with the present disclosure is shown in FIG. 4. The turbine assembly 218 is substantially similar to the turbine assembly 18 shown in FIGS. 1-3 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes a turbine case 220, a vane stage 224, and a vane-stage support 226 as shown in FIG. 4. The vane stage 224 is located between the turbine wheel assemblies 22 and includes (i) a turbine vane 238 configured to redirect air moving through a primary gas path 23 of the gas turbine engine 10 and (ii) an inner vane seal land 240 that is engaged by a seal rotor 44 to seal compartments 96, 98 within the turbine assembly 18. The vane-stage support 226 is configured to hold the turbine vane 238 and an inner vane seal land 240 included in the vane stage 224 in place relative to the turbine case 220.

The turbine case 220 includes an annular shell 228, a locating hanger 230, and a locating pin 234 as shown in FIG. 4. The annular shell 228 extends around the central reference axis 11. The locating hanger 230 extends radially-inwardly from the annular shell 228. The locating pin 234 extends radially inward through a pin hole 235 formed in the annular shell 228 and the vane-stage support 226 and is configured to circumferentially align the vane-stage support 226 relative to the turbine case 220.

The vane-stage support 226 includes a case mount 248 and a spar 250 as shown in FIG. 4. The case mount 248 couples to the annular shell 228 and engages the locating hanger 230 to axially and radially align the vane-stage support 226 relative to the turbine case 220. The spar 250 extends from the case mount 248 radially through an airfoil 242 of the turbine vane 238 to the inner vane seal land 240. In the illustrative embodiment, the case mount 248 and the spar 250 are integrally formed as a single component.

The case mount 248 includes a coupling flange 252, a retainer ring 254, and a clamp fastener 256 as shown in FIG. 4. The coupling flange 252 extends along a radially-inwardly facing surface 232 of the turbine case 220. The retainer ring 254 is spaced axially from the locating hanger 230 with the coupling flange 252 sandwiched axially therebetween. The clamp fastener 256 is configured to clamp a portion of the coupling flange 252 between the annular shell 228 and the retainer ring 254.

The coupling flange 252 includes a spar fixture portion 260, a forward portion 262, and an aft portion 264 as shown in FIG. 4. The spar fixture portion 260 extends to and is integrally formed with the spar 250 of the vane-stage support 226. The forward portion 262 extends axially forward of the spar fixture portion 260 and engages the locating hanger 230 of the turbine case 220. The aft portion 264 extends axially aft of the spar fixture portion 260 and engages the retainer ring 254.

The retainer ring 254 includes a radially extending portion 266 and an axially extending portion 268 as shown in FIG. 4. The radially extending portion 266 extends radially inward from the annular shell 228. The axially extending portion 268 extends axially forward from the radially extending portion 266 to form an L-shape when viewed in cross-section circumferentially around the central reference axis 11.

In the illustrative embodiment, the clamp fastener 256 extends radially-inwardly into the annular shell 228 of the turbine case 220 and the radially extending portion 266 of the retainer ring 254 to clamp a portion of the coupling flange 252 between the annular shell 228 and the retainer ring 254. In the illustrative embodiment, the portion of the coupling flange 252 clamped between the annular shell 228 and the retainer ring 254 is the aft portion 264.

Figure 5:
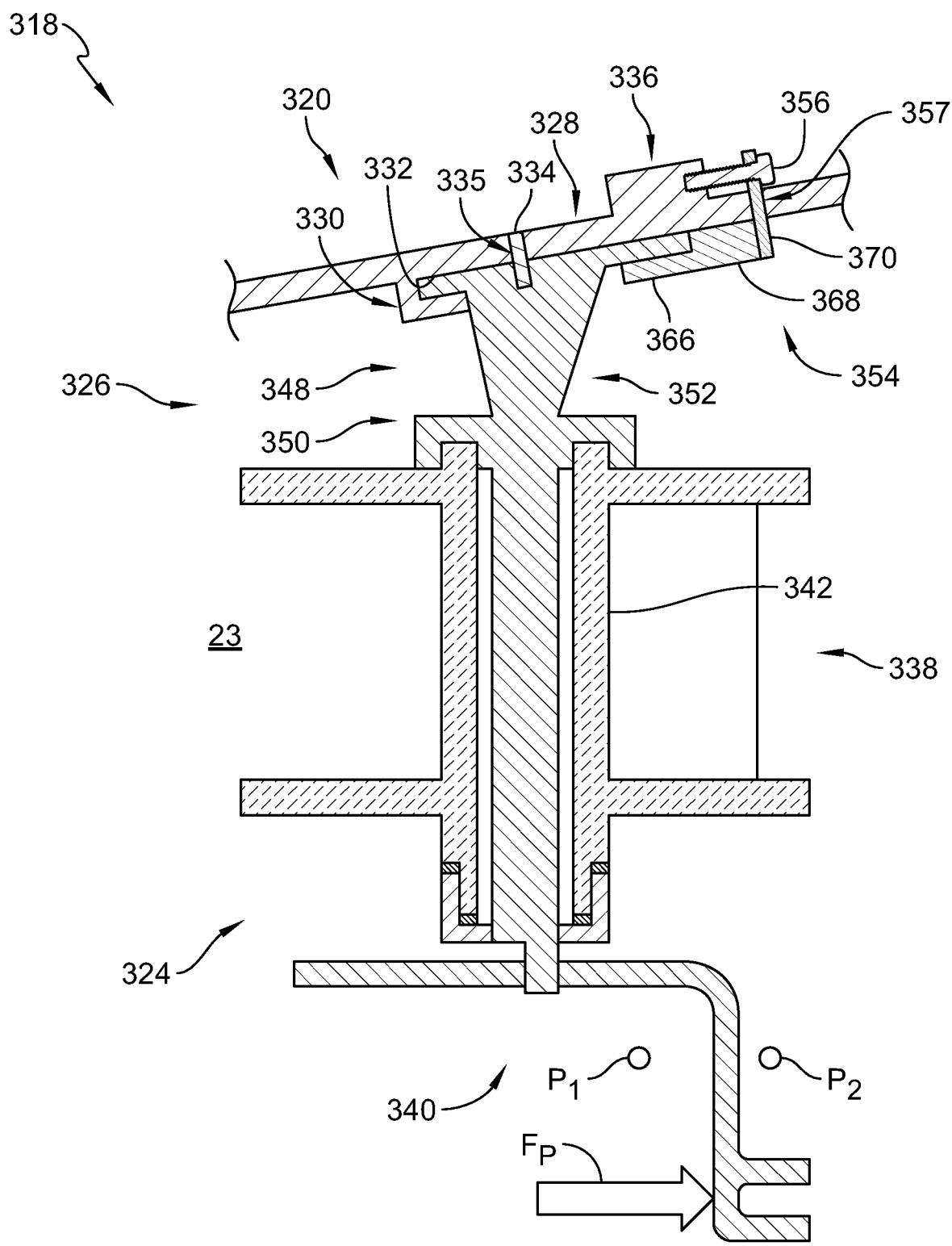
FIG. 5 is a detail view of another embodiment of a vane-stage support to be included in the turbine assembly of FIG. 2 showing that the vane-stage support includes a case mount that couples the vane-stage support to the case and includes a coupling flange located relative to the case by a locating hanger included in the case, a retainer ring spaced axially downstream of the locating hanger and configured to clamp the coupling flange therebetween, a retention ring backstop extending through the case and engaging the retainer ring, and a case fastener extending radially through the retention ring backstop and into a locating mount of the case to couple the retainer ring to the case.

Another embodiment of a turbine assembly 318 in accordance with the present disclosure is shown in FIG. 5. The turbine assembly 318 is substantially similar to the turbine assembly 18 shown in FIGS. 1-3 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

The turbine assembly 318 includes a turbine case 320, a vane stage 324, and a vane-stage support 326 as shown in FIG. 5. The vane stage 324 is located between the turbine wheel assemblies 22 and includes (i) a turbine vane 338 configured to redirect air moving through a primary gas path 23 of the gas turbine engine 10 and (ii) an inner vane seal land 340 that is engaged by a seal rotor 44 to seal compartments within the turbine assembly 18. The vane-stage support 326 is configured to hold the turbine vane 338 and an inner vane seal land 340 included in the vane stage 324 in place relative to the turbine case 320.

The turbine case 320 includes an annular shell 328, a locating hanger 330, a locating pin 334, and a mount flange 336 as shown in FIG. 4. The annular shell 328 extends around the central reference axis 11. The locating hanger 330 extends radially-inwardly from the annular shell 328. The locating pin 334 extends radially inward through a pin hole 335 formed in the annular shell 328 and the vane-stage support 326 and is configured to circumferentially align the vane-stage support 326 relative to the turbine case 320. The mount flange 336 extends radially-outwardly from the annular shell 328 axially aft of the locating hanger 330.

The vane-stage support 326 includes a case mount 348 and a spar 350 as shown in FIG. 5. The case mount 348 couples to the annular shell 328 and engages the locating hanger 330 to axially and radially align the vane-stage support 26 relative to the turbine case 320. The spar 350 extends from the case mount 348 radially through an airfoil 342 of the turbine vane 338 to the inner vane seal land 340.

The case mount 348 includes a coupling flange 352, a retainer ring 354, and a clamp fastener 356 as shown in FIG. 5. The coupling flange 352 extends along a radially-inwardly facing surface 332 of the turbine case 320. The retainer ring 354 is spaced axially from the locating hanger 330 with the coupling flange 352 sandwiched axially therebetween. The clamp fastener 356 is configured to clamp a portion of the coupling flange 352 between the annular shell 328 and the retainer ring 354.

The retainer ring 354 includes a radially extending portion 366, an axially extending portion 368, and a retainer ring backstop 370 as shown in FIG. 5. The radially extending portion 366 extends radially inward from the annular shell 328. The axially extending portion 368 extends axially forward from the radially extending portion 366 to form an L-shape when viewed in cross-section circumferentially around the central reference axis 11. The retainer ring backstop 370 extends through a portion of the annular shell 328 outside of the turbine case 320 and aft of the mount flange 336 and engages the radially extending portion 336 of the retainer ring 354.

In the illustrative embodiment, the portion of the annular shell 328 that the retainer ring backstop 370 extends through is a racetrack shaped hole 357. The racetrack hole 357 allows axial movement of the retainer ring 354 relative to the case 320. The clamp fastener 356 applies tension on the retainer ring 354 to maintain the clamping of the case mount 352 between the locating hanger 330 and the retainer ring 354.

The clamp fastener 356 extends axially forward through the retainer ring backstop 370 and into the mount flange 336 of the turbine case 320. The claim fastener 356 extends axially through the retainer ring backstop 370 and into the mount flange 336 to put tension on the retainer ring 354 and clamp the coupling flange 352 between the retainer ring 354 and the locating hanger 330.

The present disclosure teaches using a forward hook 30, 230, 330 and rear ring 54, 254, 354 as a means of locating the ceramic matrix composite vane spar 50, 250, 350 and hence the vane 38, 238, 338 to allow load to be transferred outboard to the casing 20, 220, 320. Such an attachment offers a high and tuneable second moment of area to reduce the stress induced in the casing 20, 220, 320. The attachment is lightweight and does not require any complex geometry to be manufactured in the ceramic matrix composite material.

In metallic vanes embodiments, the metallic vanes are supported with a series of hooks and rails. In some metallic embodiments, the nozzle guide vane structure is supported on hooks and/or rails attached to the outer platform. However, the hook/rail design does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the load from the nozzle guide vanes 3, 238, 338 outboard to the turbine casing 20, 220, 320. In the illustrative embodiments, the aerodynamic loading is transferred at both the inner and outer extents of the vane 38, 238, 338. The load may be transmitted through a metallic structure or spar 50, 250, 350 out into the casing 20, 220, 320. An illustrative example is shown in FIG. 3.

In the illustrative embodiments, the spar 50, 250, 350 is rigidly connected at the radially outer end and includes a sliding joint at the radially inner end. In other embodiments, the spar 50, 250, 350 may include a sliding outer fixture and rigid inner attachment.

The present disclosure also teaches how the spar 50, 250, 350 may be fixed to the casing 20, 220, 320. In the illustrative embodiment of FIG. 3, the assembly 18 provides a means of attaching the metallic spar 50 to the casing 20 at three locations. A conventional forward hook 30 axially and radially locates the vane-stage support 26 relative to the case 20. The ring 54 clamps the vane-stage support 26 at the aft end and prevents the spar 50 from becoming detached. The rear ring 54 also transfers axial and radial loads. Sliding the ring 54 into place once the spar 50 is located reduced the assembly and maintenance complexity.

In the illustrative embodiment, a bolt 56 fixes the rear ring 54 into place. The circumferential load is transferred at the bolt 56, which passes through the casing 20, spar top hat 48, and rear ring 54. In other embodiments, other suitable mechanical fasteners may be used to clamp the rear ring 54 to the case 20.

In the illustrative embodiments, the spar 50, 250, 350 may be hollow with one or more passage to allow coolant to transit from the outer cavity to cool the ceramic matrix composite vane 38, 238, 338, or to transit through to the intra-disc cavity. High pressure air could be supplied into each individual spar 50, 250, 350. In the event of damage to vanes 38, 238, 338, cooling air may be uninterrupted to the remaining intact vanes 38, 238, 338.

In the illustrative embodiment of FIG. 4, the rear ring 254 is fixed the in place after the ring 254 has been slid into position. This arrangement may require precise alignment of the drilled holes in the ring 254 as a bolt 256 is fed from outside the casing 220. The illustrative embodiment also includes an extension of the spar top hat 48, increasing the second moment of area, but increasing the weight of the spar 250.

In the illustrative embodiment of FIG. 5, the ring 354 is secured and tensioned rearwards against the vane spar 350. A racetrack slot 357 may be machined into the casing 320 through which a backstop 370 extends. The backstop 370 may be attached to the casing 320 and drawn backwards against the ring 354.

In other embodiments, the rear ring 54, 254, 354 may not be included and the case mount 48, 248, 358 of the vane-stage support 26, 226, 326 may interface with the existing features on the downstream seal segment carrier. In another embodiment, an additional plate may be included in the vane-stage support 26, 226, 326 to extend above the vane platform 80 to enable additional sealing, such as embedded perimeter sealing. In other embodiments, braid seals or discouragers may be used. The additional sealing may reduce the overall weight, as fewer parts are required. Similarly, instead of a separate forward hook 30, 230, 330, the upstream seal segment carrier may be used for attachment and locating of the vane-stage support 26, 226, 326.

In the illustrative embodiments, forging and machining methods are likely to be used to manufacture the vane-stage support 26, 226, 326 with features required to interface with the casing 20, 220, 320. The support 26, 226, 326 is made of a high temperature capable metallic alloy such as a nickel alloy or, if the environment was cool enough, potentially Waspalloy or Hastelloy. In other embodiments, C263 may be used for the support 26, 226, 326, if the forged manufacturing route was selected.

The casing 20, 220, 320 may be manufactured from an oversized forging and the hooks 30, 230, 330 may be machined in the correct locations. The rear ring 54, 254, 354 may be manufactured separately as an additional casting or forging.

The present disclosure teaches a turbine assembly 18, 218, 318 with increased assembly and maintenance flexibility, as the ring 54, 254, 354 may be slid into place to secure the vane spar 48, 248, 348 after it has been positioned. Additionally, the assembly 18, 281, 318 does not require complex features in the ceramic matrix composite material, as the attachment features are part of the spar 50, 250, 350 which interfaces with the casing 20, 220, 320 directly. The outboard end of the spar 48, 248, 348 may be tuned to optimize stress and weight trade-offs.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine with a turbine vane comprising ceramic matrix composite materials configured to redirect air moving through a primary gas path of the gas turbine engine, the assembly comprising a turbine case arranged around a central reference axis, the turbine case including (i) an annular shell and (ii) a locating hanger that extends radially inwardly from the annular shell, a vane stage including (a) the turbine vane comprising ceramic matrix composite materials shaped to form an airfoil that extends across the primary gas path of the gas turbine engine and (b) an inner vane seal land located radially inward of the turbine vane, the inner vane seal land configured to be engaged by a rotating component to create a seal separating pressure zones within the gas turbine engine when the turbine assembly is used in the gas turbine engine, and a vane-stage support comprising metallic materials that is configured to hold the turbine vane and the inner vane seal land in place relative to the turbine case, the vane-stage support including (1) a case mount that couples to the annular shell and engages the locating hanger to axially and radially align the vane-stage support relative to the turbine case and (2) a spar that extends from the case mount radially through the airfoil of the turbine vane to the inner vane seal land, wherein the turbine vane and the inner vane seal land are coupled to the spar so that forces applied to the vane stage are carried by the spar to the case mount and case during use of the turbine assembly in the gas turbine engine, wherein the case mount includes a coupling flange that extends along a radially-inwardly facing surface of the turbine case, a retainer ring spaced axially from the locating hanger with the coupling flange sandwiched axially therebetween, and a clamp fastener configured to clamp a portion of the coupling flange between the annular shell and the retainer ring.

2. The assembly of claim 1, wherein the coupling flange includes a spar fixture portion that extends to and is integrally formed with the spar of the vane-stage support, a forward portion that extends axially forward of the spar fixture portion and engages the locating hanger of the turbine case, and an aft portion that extends axially aft of the spar fixture portion and engages the retainer ring.

3. The assembly of claim 2, wherein the clamp fastener extends radially-inwardly into the annular shell of the turbine case, through the aft portion of the coupling flange, and into the retainer ring to clamp the aft portion of the coupling flange between the annular shell of the turbine case and the retainer ring.

4. The assembly of claim 2, wherein the turbine case further includes a locating pin that extends radially inward through a pin hole formed in the annular shell of the turbine case and into the spar fixture portion of the coupling flange and configured to circumferentially align the vane-stage support relative to the turbine case.

5. The assembly of claim 1, wherein the retainer ring includes a radially extending portion that extends radially inward from the annular shell and an axially extending portion that extends axially forward from the radially extending portion to form a L-shape when viewed in cross-section circumferentially around the central reference axis.

6. The assembly of claim 5, wherein the clamp fastener extends radially-inwardly into the annular shell of the turbine case and the radially extending portion of the retainer ring to clamp a portion of the coupling flange between the annular shell of the turbine case and the retainer ring.

7. The assembly of claim 5, wherein the turbine case further includes a mount flange that extends radially-outwardly from the annular shell axially aft of the locating hanger and wherein the retainer ring further includes a retainer ring backstop that extends through a portion of the annular shell outside of the turbine case and aft of the mount flange and engages the radially extending portion of the retainer ring.

8. The assembly of claim 7, wherein the clamp fastener extends axially forward through the retainer ring backstop and into the mount flange of the turbine case to clamp the coupling flange between the retainer ring and the locating hanger.

9. The assembly of claim 5, wherein the locating hanger includes a radially extending portion that extends radially inward from the annular shell and an axially extending portion that extends axially aft from the radially extending portion to form a L-shape when viewed in cross-section circumferentially around the central reference axis.

10. A turbine assembly, the assembly comprising a turbine case arranged around a reference central axis, the turbine case including a locating hanger, a turbine vane comprising ceramic matrix composite materials shaped to form an airfoil, an inner vane seal land located radially inward of the turbine vane, and a vane-stage support configured to hold the turbine vane and the inner vane seal land in place relative to the turbine case, the vane-stage support including a case mount that couples to the turbine case and engages the locating hanger to block axial movement of the vane-stage support relative to the turbine case and a spar that extends from the case mount radially through the airfoil of the turbine vane to the inner vane seal land, wherein the turbine vane and the inner vane seal land are coupled to the spar so that forces applied to the vane stage are carried by the spar to the case mount and case during use of the turbine assembly in the gas turbine engine, wherein the case mount includes a coupling flange engaged with a radially-inwardly surface of the case and a retainer ring spaced axially from the locating hanger with the coupling flange sandwiched axially therebetween to couple the vane-stage support to the turbine case.

11. The assembly of claim 10, wherein the case mount further includes a clamp fastener configured to clamp a portion of the coupling flange between the turbine case and the retainer ring.

12. The assembly of claim 11, wherein the clamp fastener extends into the annular shell, through a portion of the coupling flange, and into the retainer ring to secure the case mount to the turbine case.

13. The assembly of claim 11, wherein the clamp fastener extends into the annular shell and the retainer ring to secure the case mount to the turbine case.

14. The assembly of claim 10, wherein the inner vane seal land is fixed to the spar at a location radially inward of the turbine vane.

15. The assembly of claim 14, wherein the spar of the vane-stage support includes a rod that extends radially through the airfoil of the turbine vane, an outer load transfer collar that extends axially forward and aft of the rod and contacts the turbine vane, and an inner load transfer collar spaced radially inwardly from the outer load transfer collar that extends axially forward and aft of the rod and contacts the turbine vane.

16. The assembly of claim 10, wherein the retainer ring includes a radially extending portion that extends radially inward from the annular shell and an axially extending portion that extends axially forward from the radially extending portion to form a L-shape when viewed in cross-section circumferentially around the central reference axis with a flange receiver configured to receive an aft portion of the coupling flange.

17. The assembly of claim 16, wherein the turbine case further includes a locating pin that extends radially inward through a pin hole formed in the turbine case and into case mount and configured to circumferentially align the vane-support structure relative to the turbine case.

18. The assembly of claim 17, wherein the turbine case further includes a mount flange that extends radially-outwardly from the annular shell axially aft of the locating hanger, the retainer ring further includes a retainer ring backstop that extends outside of the turbine case through a slot formed in the annular shell aft of a mount flange formed in the turbine case and engages the radially extending portion of the retainer ring, and the clamp fastener extends axially through the retainer ring backstop into the mount flange to put tension on the retainer ring.

* * * * *